United States Patent
Zhu et al.

(10) Patent No.: US 11,507,276 B2
(45) Date of Patent: Nov. 22, 2022

(54) SYSTEMS AND METHODS TO SUBMIT UNALIGNED IO ON AN ALIGNMENT-REQUIRED IO STACK

(71) Applicant: EMC IP Holding Company LLC, Hopkinton, MA (US)

(72) Inventors: Zhonghua Zhu, Shanghai (CN); Wai C. Yim, Merrimack, NH (US); Peter J. McCann, Mason, NH (US); Guifeng Tang, Shanghai (CN); Yechen Huang, Shanghai (CN); Honggang Li, Shanghai (CN); Zhenhua Dong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 10 days.

(21) Appl. No.: 17/229,215

(22) Filed: Apr. 13, 2021

(65) Prior Publication Data
US 2022/0326854 A1    Oct. 13, 2022

(51) Int. Cl.
*G06F 3/06* (2006.01)

(52) U.S. Cl.
CPC .......... *G06F 3/0611* (2013.01); *G06F 3/0619* (2013.01); *G06F 3/0656* (2013.01); *G06F 3/0659* (2013.01); *G06F 3/0673* (2013.01)

(58) Field of Classification Search
CPC .... G06F 3/0611; G06F 3/0619; G06F 3/0656; G06F 3/0659; G06F 3/0673
See application file for complete search history.

(56) References Cited

U.S. PATENT DOCUMENTS

| | | | |
|---|---|---|---|
| 9,047,018 B1* | 6/2015 | Ananthabhotla | ..... G06F 3/0613 |
| 9,104,326 B2 | 8/2015 | Frank et al. | |
| 10,216,654 B1 | 2/2019 | Zhao et al. | |
| 10,402,096 B2 | 9/2019 | Sen et al. | |
| 10,467,102 B1 | 11/2019 | Baruch et al. | |
| 11,119,668 B1 | 9/2021 | Keller et al. | |
| 2018/0285074 A1* | 10/2018 | Shergill | .................. G06F 3/061 |
| 2019/0235759 A1* | 8/2019 | Sen | ........................ G06F 3/0685 |

* cited by examiner

*Primary Examiner* — Zhuo H Li
(74) *Attorney, Agent, or Firm* — BainwoodHuang (57) ABSTRACT

Techniques for submitting unaligned IO data to an alignment-required IO stack of a storage system. The techniques include determining that IO data specified by an IO command contains unaligned IO data, and generating an IOCB and a tunneling IOCB. The IOCB includes information pertaining to the tunneling IOCB and the tunneling IOCB includes information pertaining to a sector-unaligned buffer for storing the IO data. The tunneling IOCB satisfies a sector-alignment requirement of an IO stack. The techniques include, in response to submitting the IO command and the information included in the IOCB to the IO stack, determining that the tunneling IOCB satisfies the sector-alignment requirement of the IO stack; having satisfied the sector-alignment requirement, building a driver command based on the IO command and the information included in the tunneling IOCB; and, transferring, by executing the driver command, the unaligned IO data from the sector-unaligned buffer to a storage device.

20 Claims, 5 Drawing Sheets

SYSTEMS AND METHODS TO SUBMIT UNALIGNED IO ON AN ALIGNMENT-REQUIRED IO STACK

BACKGROUND

Storage systems are configured to service storage-related input/output (IO) commands (also referred to herein as "IO commands") issued by storage client computers (also referred to herein as "storage clients"). The IO commands (e.g., read commands, write commands) specify IO data such as data files or blocks to be read from or written to storage objects such as volumes (VOLs) or logical units (LUs) stored on storage devices such as hard disk drives (HDDs) or solid-state drives (SSDs). The 10 data are typically organized as multiples of a predetermined number of bytes (e.g., 512). Upon receipt of an IO command (e.g., a write command) at a storage system, IO data specified by the write command are copied to an IO buffer whose start and end addresses are aligned on sector (e.g., 512 byte) boundaries, as required by an IO stack of the storage system. The IO data can be directly transferred from the IO buffer to a storage device by a direct memory access (DMA) operation.

SUMMARY

For data protection purposes, a checksum process can be performed in connection with IO data specified by an IO command issued by a storage client to a storage system. Such a checksum process can generate bytes of checksum metadata, which can be concatenated with data bytes of the IO data and used to assure that the data bytes are valid. However, concatenating metadata bytes with data bytes of IO data and copying the concatenated data/metadata bytes to an IO buffer can be problematic because once the concatenated data/metadata bytes are copied, the IO buffer may no longer satisfy a sector-alignment requirement of the storage system's IO stack. In other words, the IO buffer containing the concatenated data/metadata bytes may no longer have start and end addresses that are aligned on sector (e.g., 512 byte) boundaries.

Techniques are disclosed herein for submitting unaligned IO data to an alignment-required IO stack of a storage system. The disclosed techniques can include, upon receipt of an IO command (e.g., a read/write command) at a storage system, executing a process in user space memory (also referred to herein as a "user space process") to generate a first data structure (also referred to herein as an "IO control block" (IOCB)). The IOCB can contain information including a file identifier, a destination offset, an IO length, and a pointer corresponding to an IO buffer in the user space memory. The disclosed techniques can further include determining, based at least on the IO length, whether IO data specified by the TO command can be copied to an IO buffer that is sector-aligned, i.e., whose start and end addresses are aligned on predetermined sector (e.g., 512 byte) boundaries. If it is determined that the IO data can be copied to a sector-aligned buffer, then the disclosed techniques can further include copying the IO data to the sector-aligned buffer pointed to by the pointer contained in the IOCB. The disclosed techniques can further include submitting the IO command (e.g., a write command) along with the IOCB information to the IO stack in kernel space memory. Because the IO data contained in the IO buffer is sector-aligned, it can successfully pass an alignment check executed in an OS layer of the IO stack. The disclosed techniques can further include building, based on the write command and the IOCB information, a device driver command that conforms to specified requirements and/or settings of a storage device. The disclosed techniques can further include submitting the device driver command to the storage device, allowing the IO data to be directly transferred, by a direct memory access (DMA) operation, from the sector-aligned buffer to the storage device.

Otherwise, if it is determined that the IO data cannot be copied to a sector-aligned buffer, then the disclosed techniques can further include executing the user space process to generate a second data structure (also referred to herein as a "tunneling IOCB"). For example, the IO data specified by the IO command can include multiple units of data bytes concatenated with metadata bytes (e.g., checksum metadata), which prevent the IO data from being copied to the sector-aligned buffer. The tunneling IOCB can contain information in an IO header including a magic number, a real destination offset, an IO length, and an IO operation (e.g., a read/write operation), as well as a pointer corresponding to an TO buffer in the user space memory that is sector-unaligned, i.e., whose start and end addresses are not aligned on the predetermined sector (e.g., 512 byte) boundaries. The tunneling IOCB can further contain a sufficient number of padding bytes, if needed, to assure that it can successfully pass the alignment check executed in the OS layer of the IO stack. In this case, the IOCB (i.e., the first data structure) can contain the file identifier and information derived from the tunneling IOCB (i.e., the second data structure), including an alignment address based on the real destination offset, the length of the tunneling IOCB (including the padding bytes, if needed), and a pointer corresponding to the tunneling IOCB. The disclosed techniques can further include copying the IO data (i.e., the multiple units of concatenated data/metadata bytes) to the sector-unaligned buffer pointed to by the pointer contained in the tunneling IOCB, and submitting the IO command (e.g., a write command) along with the IOCB information to the IO stack. In this case, the alignment check is executed in the OS layer of the IO stack on the tunneling IOCB, not on the sector-unaligned buffer. As described herein, the tunneling IOCB is configured to assure that it can successfully pass the alignment check. The disclosed techniques can further include detecting the magic number in the IO header of the tunneling IOCB. Upon detection of the magic number, the disclosed techniques can further include building, based on the write command and the tunneling IOCB information, a device driver command that conforms to the specified requirements and/or settings of the storage device. The disclosed techniques can further include submitting the device driver command to the storage device, allowing the IO data to be directly transferred, by a DMA operation, from the sector-unaligned buffer to the storage device.

By (i) determining that IO data specified by an IO command contains unaligned IO data, (ii) generating an IO control block (IOCB) and a tunneling IOCB, in which the IOCB contains information including a pointer to the tunneling IOCB, the tunneling IOCB contains information including a pointer to a sector-unaligned buffer, the sector-unaligned buffer is configured to store the unaligned IO data, and the tunneling IOCB is configured to satisfy a sector-alignment requirement of an IO stack, (iii) in response to submitting the IO command to the IO stack, determining that the tunneling IOCB satisfies the sector-alignment requirement of the IO stack, (iv) having satisfied the sector-alignment requirement of the IO stack, building a device driver command based on the IO command and the information contained in the tunneling IOCB, and (v) transferring, by executing the device driver command, the unaligned IO data from the sector-unaligned buffer to a storage device, such transferal of unaligned IO data to a storage device can be achieved while assuring that a sector-alignment requirement of an IO stack remains satisfied.

In certain embodiments, a method of submitting unaligned input/output (IO) data to an alignment-required IO stack of a storage system includes, in response to determining that IO data specified by an IO command contains unaligned IO data, generating a first data structure containing first IO control information, and generating a second data structure containing second IO control information. The first IO control information includes a pointer to the second data structure. The method further includes copying the unaligned IO data to an unaligned IO buffer, the second IO control information including a pointer to the unaligned IO buffer. The method further includes, in response to submitting the IO command to an IO stack, determining that the second data structure satisfies a sector-alignment requirement of the IO stack. The method further includes, having satisfied the sector-alignment requirement of the IO stack, building a device driver command based on the IO command and the second IO control information, and transferring, by executing the device driver command, the unaligned IO data from the unaligned IO buffer to a storage device.

In certain arrangements, the method further includes configuring the second IO control information to further include a magic number, a destination offset, an IO length, and an IO operation. The magic number is configured to inform a device driver executing the device driver command that the device driver command is to be built based on the second IO control information.

In certain arrangements, the building of the device driver command is performed in response to detecting the magic number included in the second IO control information.

In certain arrangements, the method further includes configuring the first IO control information to further include a file identifier, an alignment address based on the destination offset included in the second IO control information, and a length of the second data structure.

In certain arrangements, the method further includes, in response to determining that second IO data specified by a second IO command contains aligned IO data, configuring the first data structure to contain third IO control information, and copying the aligned IO data to an aligned IO buffer, the third IO control information including a pointer to the aligned IO buffer.

In certain arrangements, the method further includes, in response to submitting the second IO command to the IO stack, determining that the aligned IO buffer satisfies the sector-alignment requirement of the IO stack.

In certain arrangements, the method further includes, having satisfied the sector-alignment requirement of the IO stack, building a second device driver command based on the second IO command and the third IO control information, and transferring, by executing the second device driver command, the aligned IO data from the aligned IO buffer to a second storage device.

In certain embodiments, a system for submitting unaligned input/output (IO) data to an alignment-required IO stack of a storage system includes a memory having a user space and a kernel space. The user space includes an unaligned IO buffer, and the kernel space includes an IO stack. The system further includes processing circuitry configured to execute program instructions out of the memory, in response to determining that IO data specified by an IO command contains unaligned IO data, to generate, in the user space, a first data structure containing first IO control information, and to generate, in the user space, a second data structure containing second IO control information. The first IO control information includes a pointer to the second data structure. The processing circuitry is further configured to execute the program instructions out of the memory to copy the unaligned IO data to the unaligned IO buffer. The second IO control information includes a pointer to the unaligned IO buffer. The processing circuitry is further configured to execute the program instructions out of the memory, in response to submitting the IO command to the IO stack, to determine that the second data structure satisfies a sector-alignment requirement of the IO stack. The processing circuitry is further configured to execute the program instructions out of the memory, having satisfied the sector-alignment requirement of the IO stack, to build a device driver command based on the IO command and the second IO control information, and to transfer, by executing the device driver command, the unaligned IO data from the unaligned IO buffer to a first storage device.

In certain arrangements, the processing circuitry is further configured to execute the program instructions out of the memory to configure the second IO control information to further include a magic number, a destination offset, an IO length, and an IO operation. The magic number is configured to inform a device driver executing the device driver command that the device driver command is to be built based on the second IO control information.

In certain arrangements, the processing circuitry is further configured to execute the program instructions out of the memory to build the device driver command in response to detecting the magic number included in the second IO control information.

In certain arrangements, the processing circuitry is further configured to execute the program instructions out of the memory to configure the first IO control information to further include a file identifier, an alignment address based on the destination offset included in the second IO control information, and a length of the second data structure.

In certain arrangements, the user space further includes an aligned IO buffer. The processing circuitry is further configured to execute the program instructions out of the memory, in response to determining that second IO data specified by a second IO command contains aligned IO data, to configure the first data structure to contain third IO control information, and to copy the aligned IO data to the aligned IO buffer. The third IO control information includes a pointer to the aligned IO buffer.

In certain arrangements, the processing circuitry is further configured to execute the program instructions out of the memory, in response to submitting the second IO command to the IO stack, to determine that the aligned IO buffer satisfies the sector-alignment requirement of the IO stack.

In certain arrangements, the processing circuitry is further configured to execute the program instructions out of the memory, having satisfied the sector-alignment requirement of the IO stack, to build a second device driver command based on the second IO command and the third IO control information, and to transfer, by executing the second device driver command, the aligned IO data from the aligned IO buffer to a second storage device.

In certain arrangements, each of the first storage device and the second storage device is a Non-Volatile Memory express (NVMe) device.

In certain embodiments, a computer program product including a set of non-transitory, computer-readable media having instructions that, when executed by processing circuitry, cause the processing circuitry to perform a method including, in response to determining that IO data specified by an IO command contains unaligned IO data, generating a first data structure containing first IO control information, and generating a second data structure containing second IO control information. The first IO control information includes a pointer to the second data structure. The method further includes copying the unaligned IO data to an unaligned IO buffer. The second IO control information includes a pointer to the unaligned IO buffer. The method further includes, in response to submitting the IO command to an IO stack, determining that the second data structure satisfies a sector-alignment requirement of the IO stack. The method further includes, having satisfied the sector-alignment requirement of the IO stack, building a device driver command based on the IO command and the second IO control information, and transferring, by executing the device driver command, the unaligned IO data from the unaligned IO buffer to a storage device.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for submitting unaligned input/output (IO) data to an alignment-required IO stack of a storage system. The disclosed techniques can include determining that IO data specified by an IO command contains unaligned IO data, and generating an IO control block (IOCB) and a tunneling IOCB. The IOCB can contain information including a pointer to the tunneling IOCB. The tunneling IOCB can contain information including a pointer to a sector-unaligned buffer. The sector-unaligned buffer can be configured to store the unaligned IO data. The tunneling IOCB can be configured to satisfy a sector-alignment requirement of an IO stack. The disclosed techniques can further include, in response to submitting the IO command to the IO stack, determining that the tunneling IOCB satisfies the sector-alignment requirement of the IO stack. Having satisfied the sector-alignment requirement of the IO stack, the disclosed techniques can further include building a device driver command based on the IO command and the information contained in the tunneling IOCB. The disclosed techniques can further include submitting the device driver command to a storage device, and transferring, by executing the device driver command, the unaligned IO data from the sector-unaligned buffer to the storage device. In this way, the transferal of unaligned IO data to a storage device can be achieved while assuring that a sector-alignment requirement of an IO stack remains satisfied.

Figure 1:
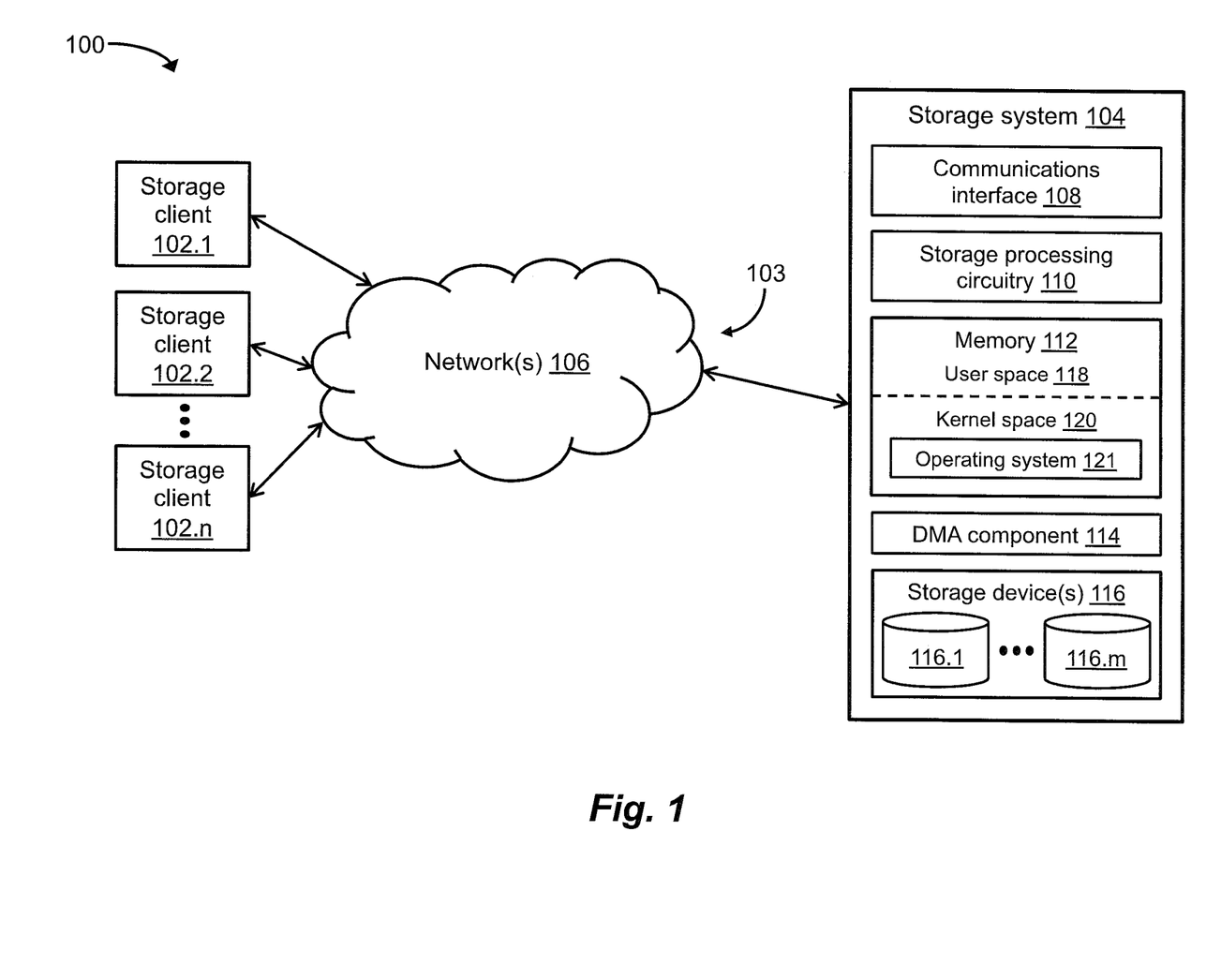
FIG. 1 is a block diagram of an exemplary storage environment in which techniques can be practiced for submitting unaligned input/output (IO) data to an alignment-required IO stack of a storage system.

FIG. 1 depicts an illustrative embodiment of an exemplary storage environment 100 in which techniques can be practiced for submitting unaligned IO data to an alignment-required IO stack of a storage system. As shown in FIG. 1, the storage environment 100 can include a plurality of storage clients 102.1, 102.2, . . . , 102.n, a storage system 104, and a communications medium 103 that includes at least one network 106. The communications medium 103 can be configured to interconnect the plurality of storage clients 102.1, . . . , 102.n and the storage system 104 to enable them to communicate and exchange data and/or control signaling. As shown in FIG. 1, the communications medium 103 can be illustrated as a cloud to represent different network topologies such as a storage area network (SAN) topology, network attached storage (NAS) topology, local area network (LAN) topology, metropolitan area network (MAN) topology, wide area network (WAN) topology, wireless network topology, wired network topology, hybrid network topology, and so on, or any suitable combination thereof. As such, the communications medium 103 can include copper-based data communications devices and cabling, fiber optic-based communications devices and cabling, wireless communications devices, and so on, or any suitable combination thereof.

As further shown in FIG. 1, the storage system 104 can include a communications interface 108, storage processing circuitry 110, a memory 112, a direct memory access (DMA) component 114, and one or more storage devices 116.1, . . ., 116.m. The communications interface 108 can include an Ethernet interface/adapter, an InfiniBand interface/adapter, a fiber channel (FC) interface/adapter, a small computer system interface (iSCSI) interface/adapter, a transport control protocol (TCP) interface/adapter, or any other suitable communications interface/adapter. The storage processing circuitry 110 can include processors, controllers, IO modules, and/or any other suitable physical or virtual computer components or combination thereof. The memory 112 can include volatile memory such as random-access memory (RAM), dynamic RAM (DRAM), or any other suitable volatile memory, as well as persistent memory such as Non-Volatile RAM (NVRAM), read-only memory (ROM), flash memory, or any other suitable persistent memory. The memory 112 can be configured to store, in a user space 118 and a kernel space 120, a variety of software constructs (e.g., software components, data structures, IO buffers), details of which are described herein with reference to FIGS. 3a and 3b. The storage processing circuitry 110 can execute the software components and/or other specialized code and data (e.g., program instructions) to carry out the techniques and/or methods disclosed herein. The memory 112 can further include, in its kernel space 120, an operating system (OS) 121 such as the Linux OS, Unix OS, Windows OS, or any other suitable OS. The storage device(s) 116 can be embodied as one or more hard disk drives (HDDs), solid-state drives (SSDs), flash drives, or any other suitable devices for storing object data and/or metadata. In some embodiments, the storage device(s) 116 can include one or more Non-Volatile Memory express (NVMe) devices, which can be configured to communicate with one or more of the software constructs stored in the memory 112 over a Peripheral Component Interconnect express (PCIe) bus using a DMA-based protocol.

In the context of the storage processing circuitry 110 of the storage system 104 being implemented with physical processors executing specialized code and data, a computer program product can be configured to deliver all or a portion of the specialized code and data to the respective processor (s). Such a computer program product can include non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

The storage system 104 of FIG. 1 can be configured to service storage-related IO commands issued by the storage clients 102.1, . . . , 102.n. The IO commands (e.g., read commands, write commands) can specify IO data such as data files or blocks to be read from or written to storage objects such as volumes (VOLs) or logical units (LUs) stored on the storage device(s) 116. The IO data can be organized as multiple units of a predetermined number of data and/or metadata bytes. Upon receipt of an IO command (e.g., a write command) at the storage system 104, IO data specified by the write command can be copied to an IO buffer in the user space 118 of the memory 112. Further, the IO data can be directly transferred from the IO buffer to the storage device(s) 116 by an operation of the DMA component 114.

Figure 2A:
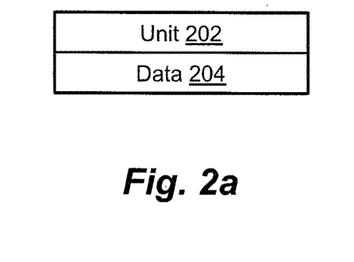
FIG. 2a is a diagram of an exemplary unit of IO data.
Figure 2B:
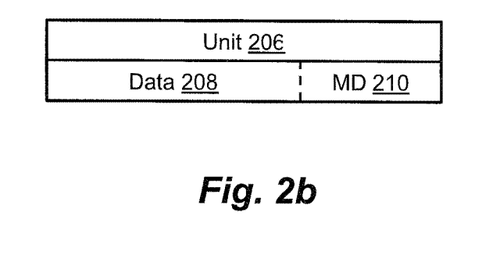
FIG. 2b is a diagram of an exemplary unit of IO data concatenated with metadata.

FIG. 2a depicts an exemplary unit 202 of data 204 that can be part of IO data specified by an IO command (e.g., a read/write command) issued by one or more of the storage clients 102.1, . . . , 102.n. For example, the data 204 can include 512 data bytes or any other suitable number(s) of data bytes. For data protection purposes, a checksum process can be performed on the data bytes to obtain checksum metadata bytes, which can be used to assure that the data bytes are valid. FIG. 2b depicts an exemplary unit 206 of data 208 concatenated with metadata (MD) 210. Like the unit 202 of FIG. 2a, the unit 206 of FIG. 2b can be part of IO data specified by an IO command (e.g., a read/write command) issued by one or more of the storage clients 102.1, . . . , 102.n. For example, the data 208 can include 512 data bytes or any other suitable number of data bytes and the MD 210 can include 8 MD bytes or any other suitable number of MD bytes. It is noted that such a checksum or Cyclical Redundancy Check (CRC) can be generated by any suitable process that can identify corruption in the data 208.

Figure 2C:
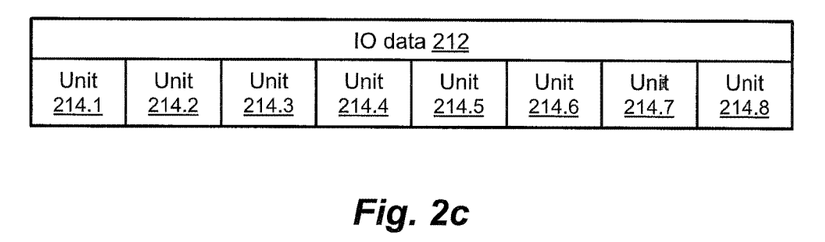
FIG. 2c is a diagram of exemplary IO data that can be specified by an IO command issued by a storage client to the storage system of FIG. 1, in which the IO data is organized as multiple units of IO data.

FIG. 2c depicts exemplary IO data 212, which can include multiple units 214.1, 214.2, . . . , 214.8, each of which can be configured like the unit 202 of FIG. 2a or the unit 206 of FIG. 2b.

Figure 2D:
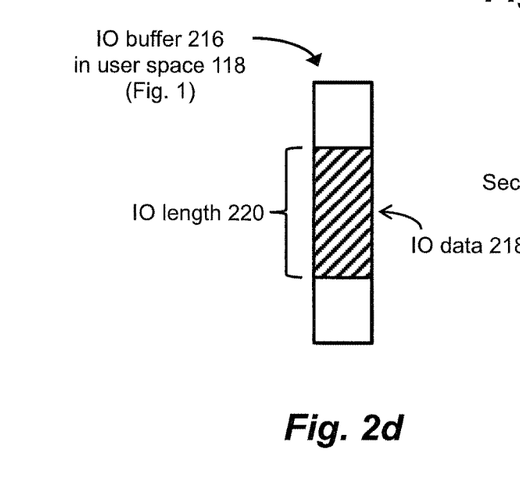
FIG. 2d is a diagram of an exemplary IO buffer containing IO data in user space memory of the storage system of FIG. 1.
Figure 2E:
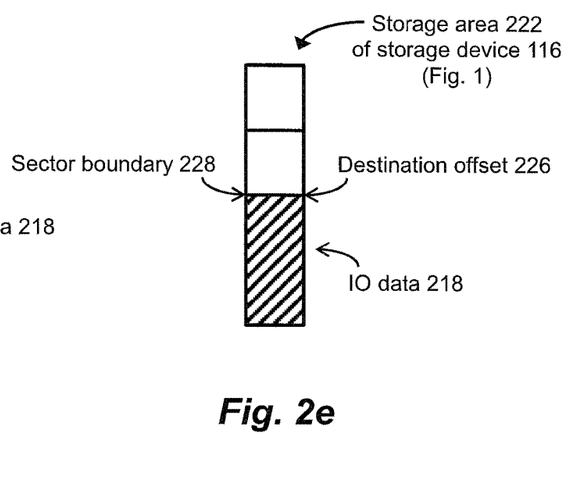
FIG. 2e is a diagram of an exemplary storage area of a storage device configured to store the IO data of FIG. 2d at a destination offset aligned on a sector boundary.

As described herein, upon receipt of an IO command (e.g., a write command) at the storage system 104, IO data specified by the write command can be copied to an IO buffer in the user space 118 of the storage system's memory 112. FIG. 2d depicts an exemplary IO buffer 216 that can be implemented in the user space 118 of the memory 112. As shown in FIG. 2d, the IO buffer 216 can store IO data 218 (illustrated by a hashed region) having an IO length 220. FIG. 2e depicts an exemplary storage area 222 of one of the storage device(s) 116 (also referred to herein as the "storage device 116"). As shown in FIG. 2e, the storage area 222 can store the IO data 218 (illustrated by a hashed region) at a destination offset 226 that is aligned on a sector (e.g., 512 byte, 520 byte) boundary 228. It is noted that if the IO data 218 includes multiple units in which each unit includes 512 bytes, then each of the IO length 220 and the destination offset 226 can be any suitable multiple of 512 bytes. Similarly, if the IO data 218 includes multiple units of data/metadata in which each unit includes 520 bytes, then each of the IO length 220 and the destination offset 226 can be any suitable multiple of 520 bytes. It is noted that such IO data can be directly transferred from the IO buffer 216 to the storage area 222 of the storage device 116 by a DMA operation.

During operation, upon receipt of a write command at the storage system 104, a process (also referred to herein as a "user space process") can be executed in the user space 118 of the storage system's memory 112 to generate a first data structure (also referred to herein as an "IO control block" (IOCB)). The IOCB can contain information including a file identifier, a destination offset, an IO length, and a pointer corresponding to an IO buffer in the user space 118. It is noted that, rather than a single pointer, the IOCB information can include a list of IO buffer addresses and lengths. The user space process can be further executed to determine, based at least on the IO length, whether IO data specified by the write command can be copied to an IO buffer that is sector-aligned, i.e., whose start and end addresses are aligned on predetermined sector (e.g., 512 byte) boundaries. If it is determined that the IO data can be copied to such a sector-aligned buffer (e.g., the IO length may be a multiple of 512 bytes), then the user space process can be further executed to copy the IO data to the sector-aligned buffer pointed to by the pointer contained in the IOCB. In addition, the user space process can be executed to submit the write command along with the IOCB information to the IO stack of the storage system's OS 121 in the kernel space 120. Because the IO data contained in the IO buffer is sector-aligned, it can successfully pass an alignment check, as required by the IO stack. A device driver in the kernel space 120 can receive the write command and the IOCB information, and build, based on the write command and IOCB information, a device driver command that conforms to specified requirements and/or settings of the storage device 116. The device driver can submit the device driver command to the storage device 116, allowing the IO data to be directly transferred from the sector-aligned buffer to the storage device 116 by an operation of the DMA component 114.

Otherwise, if it is determined that the IO data cannot be copied to such a sector-aligned buffer (e.g., the IO length may not be a multiple of 512 bytes), then the user space process can be executed to generate a second data structure (also referred to herein as a "tunneling IOCB"). As described herein with reference to FIG. 2b, IO data can include multiple data/metadata units, in which each data/metadata unit can include 512 data bytes concatenated with 8 metadata bytes. The resulting 520-byte data/metadata units can prevent the IO data from being copied to a sector-aligned buffer whose start and end addresses are aligned on the predetermined sector (e.g., 512 byte) boundaries. To address this concern, the tunneling IOCB can be generated and configured to contain, in an IO header, information including a magic number, a real destination offset, an IO length, and an IO operation (e.g., a read/write operation). The tunneling IOCB can be further configured to contain additional information including a pointer (or a list of IO buffer addresses and lengths) corresponding to an IO buffer in the user space 118 that is sector-unaligned, i.e., whose start and end addresses are not aligned on the predetermined sector (e.g., 512 byte) boundaries. It is noted, however, the tunneling IOCB can be configured to assure that it can successfully pass the alignment check required by the IO stack, e.g., by including a sufficient number of padding bytes, if needed. In this case, the IOCB (i.e., the first data structure) can contain the file identifier, as well as information derived from the tunneling IOCB (i.e., the second data structure) including an alignment address based on the real destination offset, the length of the tunneling IOCB (including the padding bytes, if needed), and a pointer corresponding to the tunneling IOCB. The user space process can be further executed to copy the IO data (i.e., the multiple units of concatenated data/metadata bytes) to the sector-unaligned buffer pointed to by the pointer contained in the tunneling IOCB, and to submit the write command along with the IOCB information to the IO stack in the kernel space 120. In this case, the alignment check is performed on the tunneling IOCB, not on the sector-unaligned buffer. As described herein, the tunneling IOCB can be configured to assure that it can successfully pass the alignment check. The device driver in the kernel space 120 can receive the write command and the IOCB information, and, using the pointer to the tunneling IOCB included in the IOCB, detect the magic number in the IO header of the tunneling IOCB. The magic number (or any other suitable number, identifier, or indication) effectively informs the device driver that a device driver command is to be built based on the tunneling IOCB information contained in the second data structure, rather than the IOCB information contained in the first data structure. In response to detecting the magic number, the device driver can build, based on the write command and the tunneling IOCB information, a device driver command that conforms to the specified requirements and/or settings of the storage device 116. The device driver can submit the device driver command to the storage device 116, allowing the IO data to be directly transferred from the sector-unaligned buffer to the storage device 116 by an operation of the DMA component 114.

Figure 3A:
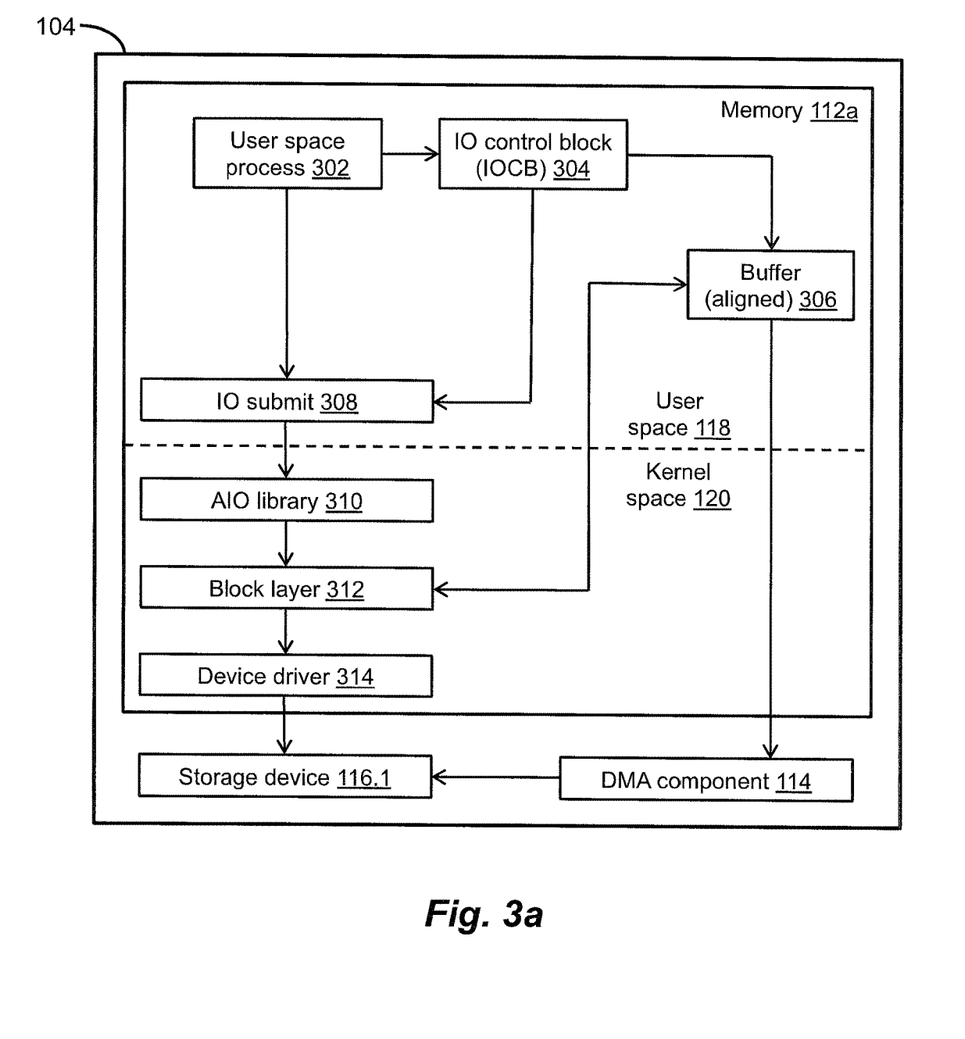
FIG. 3a is a block diagram of an exemplary memory, DMA component, and storage device included in the storage system of FIG. 1, in which the memory is configured to include, in its user space, an exemplary IO control block (IOCB) and sector-aligned buffer.
Figure 3B:
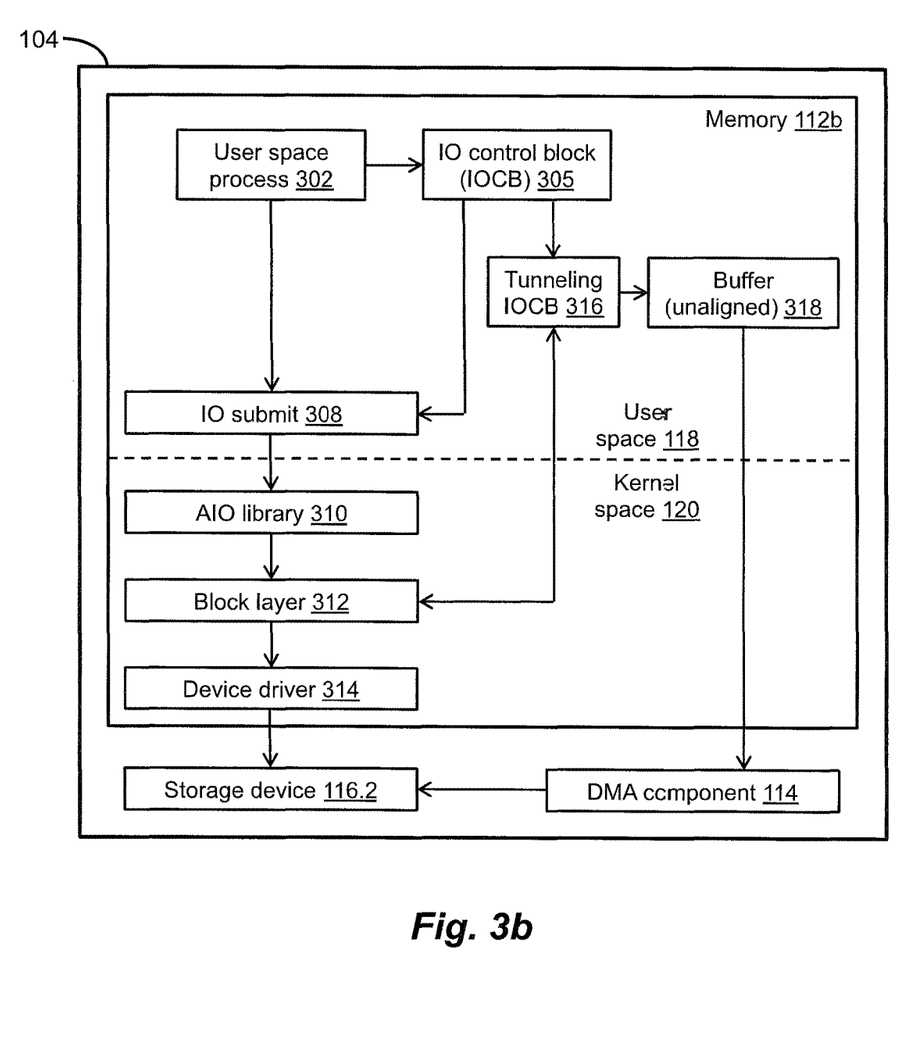
FIG. 3b is a block diagram of the memory, DMA component, and storage device of FIG. 3a, in which the memory is configured to include, in its user space, an exemplary IOCB, tunneling IOCB, and sector-unaligned buffer.

The disclosed techniques for submitting unaligned IO data to an alignment-required IO stack of a storage system will be further understood with reference to the following illustrative example and FIGS. 3a and 3b. FIG. 3a depicts an illustrative embodiment of the memory 112 (also referred to herein as the "memory 112a"), as well as the DMA component 114 and the storage device 116.1 included in the storage system 104. As shown in FIG. 3a, the memory 112a includes, in the user space 118, a plurality of software constructs and/or components, including a user space process 302, an IOCB 304, a sector-aligned buffer ("buffer (aligned)") 306, and a representation of a system call ("IO submit") 308. The memory 112a further includes, in the kernel space 120, an IO stack including an asynchronous IO (AIO) library 310, a block layer 312, and a device driver 314. FIG. 3b also depicts, in addition to the DMA component 114 and the storage device 116.2, another illustrative embodiment of the memory 112 (also referred to herein as the "memory 112b"), which includes, in the user space 118, the user space process 302, an IOCB 305, a tunneling IOCB 316, a sector-unaligned buffer ("buffer (unaligned)") 318, and the representation of the IO submit 308. The memory 112b further includes, in the kernel space 120, the IO stack including the AIO library 310, the block layer 312, and the device driver 314.

In this example, upon receipt of a first write command at the storage system 104, the user space process 302 determines, based at least on an IO length of IO data specified by the first write command, that the IO data can be copied to an IO buffer whose start and end addresses are aligned on the predetermined sector (e.g., 512 byte) boundaries. Having determined that the IO data of the first write command can be copied to such a sector-aligned buffer, the user space process 302 generates the IOCB 304, which contains information including a file identifier, a destination offset, an IO length, and a pointer corresponding to the buffer (aligned) 306 whose start and end addresses are aligned on the predetermined sector (e.g., 512 byte) boundaries. The user device process 302 copies the IO data to the buffer (aligned) 306 and makes the system call (i.e., the IO submit 308) to submit the first write command and the IOCB information to the block layer 312 using the AIO library 310 (e.g., a Linux AIO library).

It is assumed that the block layer 312 is configured to enforce certain device constraints, including a device constraint that prevents IO data from crossing predetermined sector (e.g., 512 byte) boundaries on a storage device (e.g., HDD, SSD). To enforce this device constraint, the block layer 312 performs an alignment check on the IO data contained in the buffer (aligned) 306, which is pointed to by the pointer included in the IOCB 304. Because the IO data contained in the buffer (aligned) 306 are aligned on the predetermined sector (e.g., 512 byte) boundaries, it successfully passes the alignment check performed by the block layer 312. Once the IO data successfully passes the alignment check, the block layer 312 provides the first write command and the IOCB information to the device driver 314. Based on the first write command and IOCB information, the device driver 314 builds a device driver command that conforms to the specified requirements and/or settings of the storage device 116.1. In this example, each of the storage devices 116.1, 116.2 can be an NVMe device or any other suitable storage device. In this example, it is assumed that the settings of the storage device 116.1 can be configured to support a 512-byte sector or any other suitable sector boundary alignment of the IO data specified by the first write command. The device driver 314 submits the device driver command to the storage device 116.1, which, upon execution of the device driver command, receives a direct transfer of the IO data contained in the buffer (aligned) 306 by an operation of the DMA component 114.

In this example, upon receipt of a second write command at the storage system 104, the user space process 302 determines, based at least on an IO length of IO data specified by the second write command, that the IO data cannot be copied to an IO buffer whose start and end addresses are aligned on the predetermined sector (e.g., 512 byte) boundaries. For example, the IO data specified by the second write command may include multiple 520-byte data/ metadata units. Having determined that the IO data specified by the second write command cannot be copied to such a sector-aligned buffer, the user space process 302 generates the tunneling IOCB 316, which contains information including, in an IO header, a magic number, a real destination offset, an IO length, and an IO operation (e.g., a write operation), as well as a pointer corresponding to the buffer (unaligned) 318 whose start and end addresses are not aligned on the predetermined sector (e.g., 512 byte) boundaries. For example, the IO length contained in the tunneling IOCB 316 can be a multiple of 520 bytes or any other suitable number of bytes. Further, the real destination offset can be aligned on 520-byte sector boundaries or any other suitable sector boundaries. The tunneling IOCB 316 can further contain a sufficient number of padding bytes, if needed, to assure that it can successfully pass the alignment check performed by the block layer 312. The user space process 302 further generates an IOCB 305, which contains a file identifier, as well as an alignment address (based on the real destination offset), the length of the tunneling IOCB (including the padding bytes, if needed), and a pointer corresponding to the tunneling IOCB 316. For example, the length of the tunneling IOCB can be a multiple of 512 bytes or any other suitable number of bytes. Further, the alignment address contained in the IOCB 304 can be aligned on the predetermined 512-byte sector boundaries or any other suitable sector boundaries. In this example, the alignment address can be expressed, as follows:

$$\text{Alignment address} = \frac{\text{real destination offset}}{520} * 512. \quad (1)$$

The user space process copies the IO data specified by the second write command to the buffer (unaligned) 318 and makes the system call (i.e., the IO submit 308) to submit the second write command and the IOCB information to the block layer 312 using the AIO library 310. To enforce its device constraint, the block layer 312 performs the alignment check on the tunneling IOCB 316, which is pointed to by the pointer contained in the IOCB 305. As described herein, the tunneling IOCB 316 can contain a sufficient number of padding bytes, if needed, to assure that it can successfully pass the alignment check performed by the block layer 312. Once the tunneling IOCB 316 successfully passes the alignment check, the block layer 312 provides the second write command and the IOCB information to the device driver 314. Using the pointer to the tunneling IOCB 316 included in the IOCB information, the device driver 314 detects the magic number included in the IO header of the tunneling IOCB 316. The magic number effectively informs the device driver 314 that a device driver command is to be built based on the tunneling IOCB information rather than the IOCB information. In response to detecting the magic number, the device driver 314 builds, based on the second write command and the tunneling IOCB information (e.g., the real destination offset, the IO length, the IO operation), a device driver command that conforms to the specified requirements and/or settings of the storage device 116.2 (e.g., the NVMe device). In this example, it is assumed that the settings of the storage device 116.2 can be configured to support a 520-byte sector or any other suitable sector boundary alignment of the IO data specified by the second write command. The device driver 314 submits the device driver command to the storage device 116.2, which, upon execution of the device driver command, receives a direct transfer of the IO data contained in the buffer (unaligned) 318 by an operation of the DMA component 114.

Figure 4:
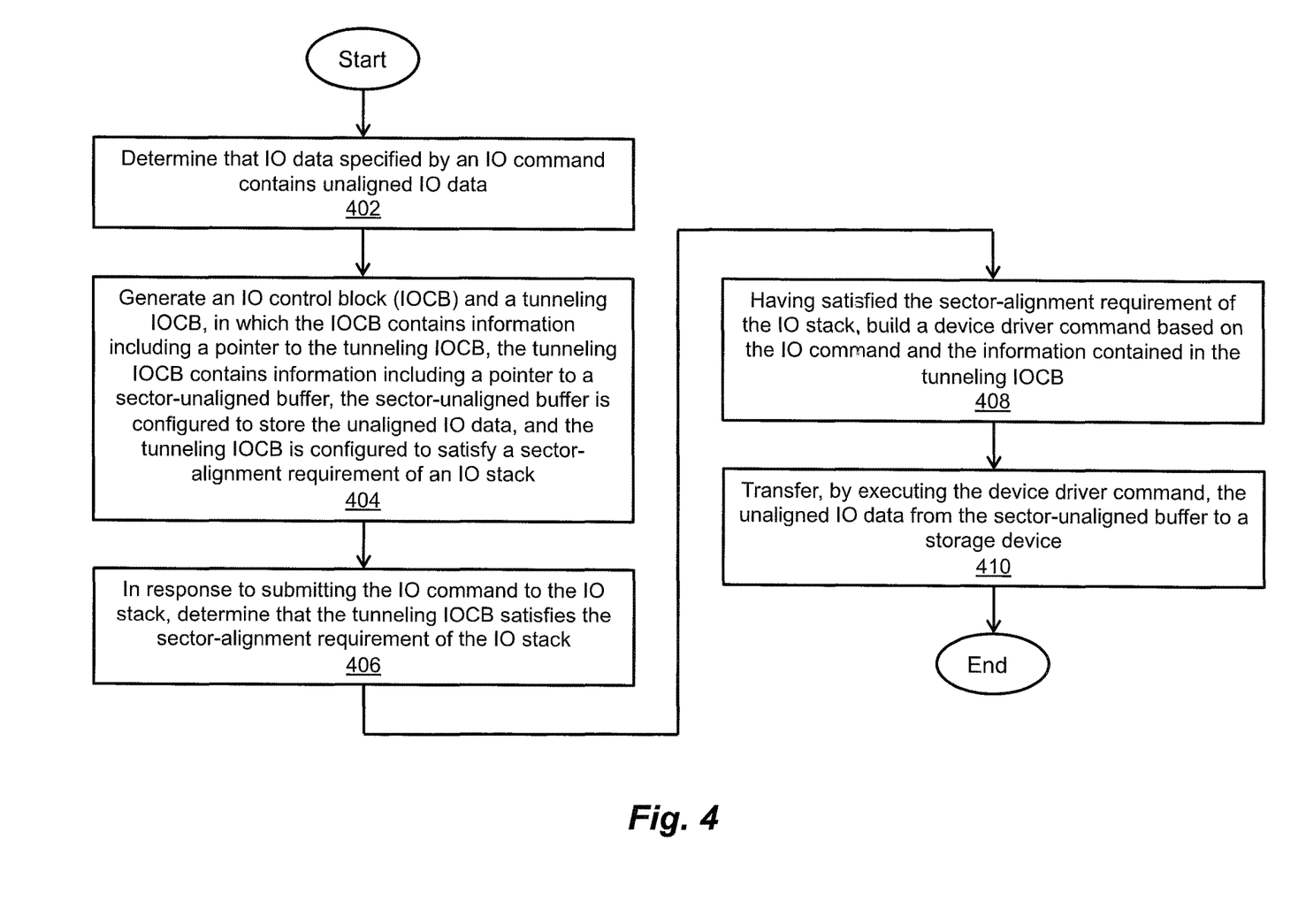
FIG. 4 is a flow diagram of an exemplary method of submitting unaligned IO data to an alignment-required IO stack of a storage system.

An exemplary method of submitting unaligned IO data to an alignment-required IO stack of a storage system is described below with reference to FIG. 4. As depicted in block 402, IO data specified by an IO command is determined to contain unaligned IO data. As depicted in block 404, an IO control block (IOCB) and a tunneling IOCB are generated, in which the IOCB contains information including a pointer to the tunneling IOCB, the tunneling IOCB contains information including a pointer to a sector-unaligned buffer, the sector-unaligned buffer is configured to store the unaligned IO data, and the tunneling IOCB is configured to satisfy a sector-alignment requirement of an IO stack. As depicted in block 406, in response to submitting the IO command to the IO stack, the tunneling IOCB is determined to satisfy the sector-alignment requirement of the IO stack. As depicted in block 408, having satisfied the sector-alignment requirement of the IO stack, a device driver command is built based on the IO command and the information contained in the tunneling IOCB. As depicted in block 410, by executing the device driver command, the unaligned IO data is transferred from the sector-unaligned buffer to a storage device. In this way, such transferal of unaligned IO data to a storage device can be achieved while assuring that a sector-alignment requirement of an IO stack remains satisfied.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of submitting unaligned input/output (IO) data to an alignment-required IO stack of a storage system, comprising:
   in response to determining that IO data specified by an IO command contains unaligned IO data:
      generating a first data structure containing first IO control information; and
      generating a second data structure containing second IO control information, the first IO control information including a pointer to the second data structure;
   copying the unaligned IO data to an unaligned IO buffer, the second IO control information including a pointer to the unaligned IO buffer;
   in response to submitting the IO command to an IO stack, determining that the second data structure satisfies a sector-alignment requirement of the IO stack;
   having satisfied the sector-alignment requirement of the IO stack, building a device driver command based on the IO command and the second IO control information; and
   transferring, by executing the device driver command, the unaligned IO data from the unaligned IO buffer to a storage device.

2. The method of claim 1 further comprising:
   configuring the second IO control information to further include a magic number, a destination offset, an IO length, and an IO operation, the magic number being configured to inform a device driver executing the device driver command that the device driver command is to be built based on the second IO control information.

3. The method of claim 2 wherein the building of the device driver command is performed in response to detecting the magic number included in the second IO control information.

4. The method of claim 2 further comprising:
   configuring the first IO control information to further include a file identifier, an alignment address based on the destination offset included in the second IO control information, and a length of the second data structure.

5. The method of claim 1 further comprising:
   in response to determining that second IO data specified by a second IO command contains aligned IO data:
      configuring the first data structure to contain third IO control information; and
      copying the aligned IO data to an aligned IO buffer, the third IO control information including a pointer to the aligned IO buffer.

6. The method of claim 5 further comprising:
   in response to submitting the second IO command to the IO stack, determining that the aligned IO buffer satisfies the sector-alignment requirement of the IO stack.

7. The method of claim 6 further comprising:
   having satisfied the sector-alignment requirement of the IO stack, building a second device driver command based on the second IO command and the third IO control information; and
   transferring, by executing the second device driver command, the aligned IO data from the aligned IO buffer to a second storage device.

8. A system for submitting unaligned input/output (IO) data to an alignment-required IO stack of a storage system, comprising:
   a memory having a user space and a kernel space, wherein the user space includes an unaligned IO buffer, and wherein the kernel space includes an IO stack; and
   processing circuitry configured to execute program instructions out of the memory to:
      in response to determining that IO data specified by an IO command contains unaligned IO data:
         generate, in the user space, a first data structure containing first IO control information; and
         generate, in the user space, a second data structure containing second IO control information, the first IO control information including a pointer to the second data structure;
      copy the unaligned IO data to the unaligned IO buffer, the second IO control information including a pointer to the unaligned IO buffer;
      in response to submitting the IO command to the IO stack, determine that the second data structure satisfies a sector-alignment requirement of the IO stack;
      having satisfied the sector-alignment requirement of the IO stack, build a device driver command based on the IO command and the second IO control information; and
      transfer, by executing the device driver command, the unaligned IO data from the unaligned IO buffer to a first storage device.

9. The system of claim 8 wherein the processing circuitry is further configured to execute the program instructions out of the memory to configure the second IO control information to further include a magic number, a destination offset, an IO length, and an IO operation, wherein the magic number is configured to inform a device driver executing the device driver command that the device driver command is to be built based on the second IO control information.

10. The system of claim 9 wherein the processing circuitry is further configured to execute the program instructions out of the memory to build the device driver command in response to detecting the magic number included in the second IO control information.

11. The system of claim 9 wherein the processing circuitry is further configured to execute the program instructions out of the memory to configure the first IO control information to further include a file identifier, an alignment address based on the destination offset included in the second IO control information, and a length of the second data structure.

12. The system of claim 8 wherein the user space further includes an aligned IO buffer, and wherein the processing circuitry is further configured to execute the program instructions out of the memory, in response to determining that second IO data specified by a second IO command contains aligned IO data, to configure the first data structure to contain third IO control information, and to copy the aligned IO data to the aligned IO buffer, wherein the third IO control information includes a pointer to the aligned IO buffer.

13. The system of claim 12 wherein the processing circuitry is further configured to execute the program instructions out of the memory, in response to submitting the second IO command to the IO stack, to determine that the aligned IO buffer satisfies the sector-alignment requirement of the IO stack.

14. The system of claim 13 wherein the processing circuitry is further configured to execute the program instructions out of the memory, having satisfied the sector-alignment requirement of the IO stack, to build a second device driver command based on the second IO command and the third IO control information, and to transfer, by executing the second device driver command, the aligned IO data from the aligned IO buffer to a second storage device.

15. The system of claim 14 wherein each of the first storage device and the second storage device is a Non-Volatile Memory express (NVMe) device.

16. A computer program product including a set of non-transitory, computer-readable media having instructions that, when executed by processing circuitry, cause the processing circuitry to perform a method comprising:
in response to determining that input/output (IO) data specified by an IO command contains unaligned IO data:
generating a first data structure containing first IO control information; and
generating a second data structure containing second IO control information, the first IO control information including a pointer to the second data structure;
copying the unaligned IO data to an unaligned IO buffer, the second IO control information including a pointer to the unaligned IO buffer;
in response to submitting the IO command to an IO stack, determining that the second data structure satisfies a sector-alignment requirement of the IO stack;
having satisfied the sector-alignment requirement of the IO stack, building a device driver command based on the IO command and the second IO control information; and
transferring, by executing the device driver command, the unaligned IO data from the unaligned IO buffer to a storage device.

17. The computer program product of claim 16 wherein the method further comprises:
configuring the second IO control information to further include a magic number, a destination offset, an IO length, and an IO operation, the magic number being configured to inform a device driver executing the device driver command that the device driver command is to be built based on the second IO control information.

18. The computer program product of claim 17 wherein the building of the device driver command is performed in response to detecting the magic number included in the second IO control information.

19. The computer program product of claim 17 wherein the method further comprises:
configuring the first IO control information to further include a file identifier, an alignment address based on the destination offset included in the second IO control information, and a length of the second data structure.

20. The computer program product of claim 16 wherein the method further comprises:
in response to determining that second IO data specified by a second IO command contains aligned IO data:
configuring the first data structure to contain third IO control information; and
copying the aligned IO data to an aligned IO buffer, the third IO control information including a pointer to the aligned IO buffer;
in response to submitting the second IO command to the IO stack, determining that the aligned IO buffer satisfies the sector-alignment requirement of the IO stack;
having satisfied the sector-alignment requirement of the IO stack, building a second device driver command based on the second IO command and the third IO control information; and
transferring, by executing the second device driver command, the aligned IO data from the aligned IO buffer to a second storage device.

* * * * *